United States Patent
Tang et al.

(10) Patent No.: US 8,117,160 B1
(45) Date of Patent: Feb. 14, 2012

(54) METHODS AND APPARATUS FOR CREATING POINT IN TIME COPIES IN A FILE SYSTEM USING REFERENCE COUNTS

(75) Inventors: Hongliang Tang, Shrewsbury, MA (US); Sairam Veeraswamy, South Grafton, MA (US); Peter Bixby, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 571 days.

(21) Appl. No.: 12/241,715

(22) Filed: Sep. 30, 2008

(51) Int. Cl.
*G06F 7/00* (2006.01)

(52) U.S. Cl. ........................................ 707/639; 707/649

(58) Field of Classification Search .................. 707/639, 707/649
See application file for complete search history.

(56) References Cited

U.S. PATENT DOCUMENTS

| | | | |
|---|---|---|---|
| 6,434,681 B1 | 8/2002 | Armangau | |
| 6,792,518 B2 | 9/2004 | Armangau et al. | |
| 6,934,822 B2 | 8/2005 | Armangau et al. | |
| 6,957,362 B2 | 10/2005 | Armangau | |
| 7,035,881 B2 | 4/2006 | Tummala et al. | |
| 7,284,016 B2 | 10/2007 | Venkatesh et al. | |
| 7,296,125 B2 | 11/2007 | Ohran | |
| 7,523,278 B2 | 4/2009 | Thompson et al. | |
| 7,546,431 B2 | 6/2009 | Stacey et al. | |
| 7,549,028 B2 | 6/2009 | Thompson et al. | |
| 7,555,504 B2 | 6/2009 | Bixby et al. | |
| 7,567,991 B2 | 7/2009 | Armangau et al. | |
| 7,676,514 B2 | 3/2010 | Faibish et al. | |
| 7,716,171 B2 | 5/2010 | Kryger | |
| 7,716,185 B2 | 5/2010 | Thompson et al. | |
| 7,716,435 B1 | 5/2010 | Allen | |
| 2002/0078239 A1* | 6/2002 | Howard et al. | 709/245 |
| 2003/0158861 A1* | 8/2003 | Sawdon et al. | 707/200 |
| 2003/0158873 A1* | 8/2003 | Sawdon et al. | 707/204 |
| 2004/0243775 A1* | 12/2004 | Coulter et al. | 711/162 |
| 2005/0033720 A1* | 2/2005 | Verma et al. | 707/1 |
| 2005/0033929 A1* | 2/2005 | Burton et al. | 711/162 |
| 2005/0065986 A1 | 3/2005 | Bixby et al. | |
| 2006/0143412 A1 | 6/2006 | Armangau | |
| 2010/0076940 A1* | 3/2010 | Bordawekar et al. | 707/704 |

* cited by examiner

*Primary Examiner* — Baoquoc To
*Assistant Examiner* — Christopher J Raab
(74) *Attorney, Agent, or Firm* — Muirhead and Saturnelli, LLC

(57) ABSTRACT

Embodiments of the invention relate to maintaining reference counts in a file system to track when a block is available to be freed. When a snapshot copy of a file is created, rather than copying all the blocks of the file for the snapshot copy, the snapshot inode is given pointers to the blocks of the file. Rather than updating the reference counts for all these blocks to indicate that they are now in use by more than one file, the update of reference counts for at least some of these blocks may be deferred until a later time.

6 Claims, 15 Drawing Sheets

METHODS AND APPARATUS FOR CREATING POINT IN TIME COPIES IN A FILE SYSTEM USING REFERENCE COUNTS

TECHNICAL FIELD

The present invention relates to creating point in time copies of files in a file system and maintaining and updating reference counts for blocks in the file system.

BACKGROUND

A file is logical unit of data in a file system. A snapshot of a file is a read-only copy of a file as it existed at a certain time. That is, a snapshot of a file that can be read from and written to (hereinafter referred to as a production file) may be created at a given point in time that reflects the content of the production file at that particular point in time. If the production file is modified after the snapshot is created, the snapshot of the production file remains the same. The snapshot file can be used in numerous ways. For example, if the production file later becomes lost, corrupted, or modified in a way that a user is unhappy with, the snapshot can be used to restore the production file to its state at the time the snapshot was created.

FIG. 1 is a block diagram of an example of a conventional inode for a file in a typical file system. An inode is data structure for a file that is used to store information about the file. Typically, a file system includes an inode for each file in the file system. FIG. 1 illustrates some of the information stored about a file in a conventional inode 180. Inode 180 includes a mode field 181, an access time field 182, a change time field 183, one or more data block pointers 184, and one or more indirect block pointers 185. The mode field 181 specifies the access permissions for the file (e.g., which users can read, write, and/or execute the file), the access time field 182 is used to store the last time the file was accessed, the change time field 183 is used to store the last time that the file was modified, and the data block pointer(s) 184 and indirect block pointer(s) 185 are used to specify the storage locations at which the file data is stored on a storage medium such as a physical disk or logical volume. In particular, data block pointers 184 are pointers to blocks on disk or in a logical volume that store file data, and indirect block pointers 185 are pointers to blocks on disk or in a logical volume that store pointers to data blocks or other indirect blocks.

One possible way to create a snapshot of a file is to create a copy of the inode for the file, create a copy of each data block and indirect block referenced by the file, and modify the data block pointers and indirect block pointers in the copy of the inode to point to the newly created copies of the data blocks and indirect blocks. For example, as shown in FIG. 2, production inode 201 points to two data blocks (i.e., data block 203 and data block 205). To create a snapshot of the file corresponding to inode 201, a copy 207 of production inode 201 may be created and a copies 209 and 211 of data blocks 203 and 205 may be created. The pointers in inode 207 may be modified to point to data blocks 209 and 211 instead of data blocks 203 and 205 (as in the inode for the production file).

One disadvantage to this approach is that duplicate copies of indirect blocks and/or data blocks may be needlessly stored. These duplicate data blocks may unnecessarily consume storage capacity. For example, in the example of FIG. 2, duplicate copies of data block 203 and data block 205 are created when the snapshot is created. If the content of the production file is never modified after the snapshot is created, then the duplicate copies of these data blocks are never needed to restore the production file to its state at the time of creation of the snapshot.

Thus, in a more sophisticated approach to creating a snapshot of a file, a copy of the inode of the production file is created when the snapshot is taken, but data blocks and/or indirect blocks are copied only when the corresponding blocks in the production file are modified. For example, as shown in FIG. 3A, production inode 301 includes pointers to data block 303 and data block 305. When a snapshot is taken, snapshot inode 307 is created by copying production inode 301. Initially, snapshot inode 307 included pointers to data block 303 and data block 305. If the production file is modified, then new blocks may be allocated to store the modified data and the appropriate pointer or pointers in production inode 301 may be modified to point to the new data blocks. For example, as shown in FIG. 3B, if a write occurs that would result in data block 303 being modified, a new data block 309 is allocated to store the modified data block and the pointer to data block 303 in production inode 301 is modified to point to data block 309. Snapshot inode 307 still points to the original data blocks of the production file (i.e., data blocks 303 and 305).

When using such a technique, determining whether blocks that are pointed to by a snapshot inode can be reallocated (i.e., freed) when the snapshot is deleted may present challenges. That is, when a snapshot is deleted, it is desirable to reallocate the blocks pointed to by the snapshot, if no other snapshots or production files are using those blocks.

One prior art technique for determining whether blocks that are pointed to by a deleted snapshot can be freed is described in U.S. patent application Ser. No. 10/668,546, issued as U.S. Pat. No. 7,555,504 to Bixby et al., which is incorporated herein by reference in its entirety. This application describes a technique whereby each block is owned by either a production copy of a file or a snapshot copy. Ownership of a block is designated using a special owner bit (e.g., the most significant bit) in the pointer to the block in the inode of the snapshot or production file. If a snapshot or production file is designated as the owner of an indirect block, then it is considered the owner of all blocks pointed to directly or indirectly by the indirect block. When a snapshot of a production file is deleted, the blocks owned by the snapshot are analyzed. If a block is owned by the snapshot and the corresponding block in the next most recent snapshot of the same production file (or the production file if the snapshot being deleted is the most recent) is not owned by that snapshot, then ownership of the block is passed to the next most recent snapshot. If a block is owned by the snapshot and the corresponding block in the next most recent snapshot of the same production file (or the production file if the snapshot being deleted is the most recent) is owned by that snapshot (or no corresponding block can be found), then the block may be freed.

SUMMARY

One embodiment is directed to a method for use in a computer system comprising a file system that stores a plurality of files in a plurality of data blocks allocated to the file system, each of the plurality of files comprising at least one of the plurality of data blocks allocated to the first system, the computer system maintaining a reference count for at least some of the data blocks, each reference count for a corresponding data block providing an indication of a number of files that share the corresponding data block, the method comprising acts of: (A) in response to a request to create a point in time copy of at least one existing file in the file system, the at least one existing file comprising at least one data block; (A1) creating at least one new file that is a point in time copy of the at least existing file; and (A2) deferring updating the reference count for the at least one data block in the at least one existing file to reflect that the at least one data block is shared by the at least one new file. Another embodiment is directed to at least one computer readable medium encoded with instructions that, when executed, perform the above-described method.

A further embodiment is directed to a computer system comprising: a file system that stores a plurality of files in a plurality of data blocks allocated to the file system, each of the plurality of files comprising at least one of the plurality of data blocks allocated to the first system, the computer system maintaining a reference count for at least some of the data blocks, each reference count for a corresponding data block providing an indication of a number of files that share the corresponding data block; and least one controller that: in response to a request to create a point in time copy of at least one existing file in the file system, the at least one existing file comprising at least one data block, creates at least one new file that is a point in time copy of the at least existing file; and defers updating the reference count for the at least one data block in the at least one existing file to reflect that the at least one data block is shared by the at least one new file.

Another embodiment is directed to a method for use in a computer system comprising at least one file system that stores a plurality of files in a plurality of data blocks allocated to the at least one file system, each of the plurality of files comprising at least one of the plurality of data blocks allocated to the at least one file system, the at least one file system comprising a production file and a point-in-time copy of the production file created by copying the production file at a point in time after creation of the at least one production file, the computer system maintaining a reference count for at least some of the data blocks, each reference count for a corresponding data block providing an indication of a number of files that share the corresponding data block. The method comprises an act of: (A) in response to a request to create a branch file from the point-in-time copy of the production file, creating the branch file by creating a writable copy of the point-in-time copy of the production, wherein the point-in-time copy comprises at least one data block. A further embodiment is directed to at least one computer readable medium encoded with instructions that, when executed, perform the above-described method.

Another embodiments is directed to a computer system comprising: at least one file system that stores a plurality of files in a plurality of data blocks allocated to the at least one file system, each of the plurality of files comprising at least one of the plurality of data blocks allocated to the at least one file system, the at least one file system comprising a production file and a point-in-time copy of the production file created by copying the production file at a point in time after creation of the at least one production file; a memory for storing a reference count for at least some of the data blocks, each reference count for a corresponding data block providing an indication of a number of files that share the corresponding data block; and at least one controller that, in response to a request to create a branch file from the point-in-time copy of the production file, creates the branch file by creating a writable copy of the point-in-time copy of the production, wherein the point-in-time copy comprises at least one data block.

BRIEF DESCRIPTION OF THE DRAWINGS

Aspects of the invention are described with reference to illustrative embodiments and the following drawings in which like reference characters represent like elements, and wherein.

DETAILED DESCRIPTION

Figure 1:
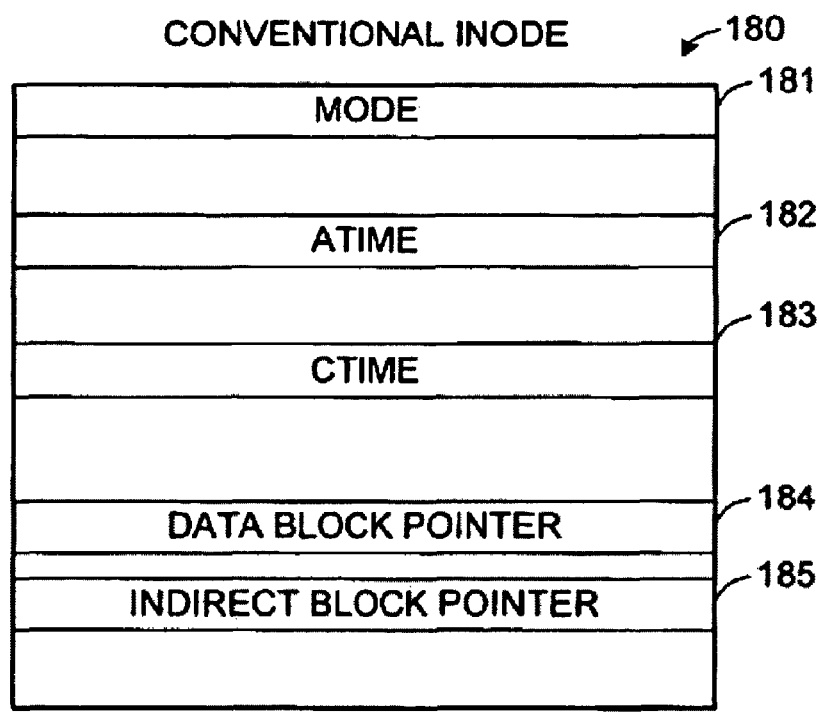
FIG. 1 is a block diagram of a conventional inode for a file.
Figure 2:
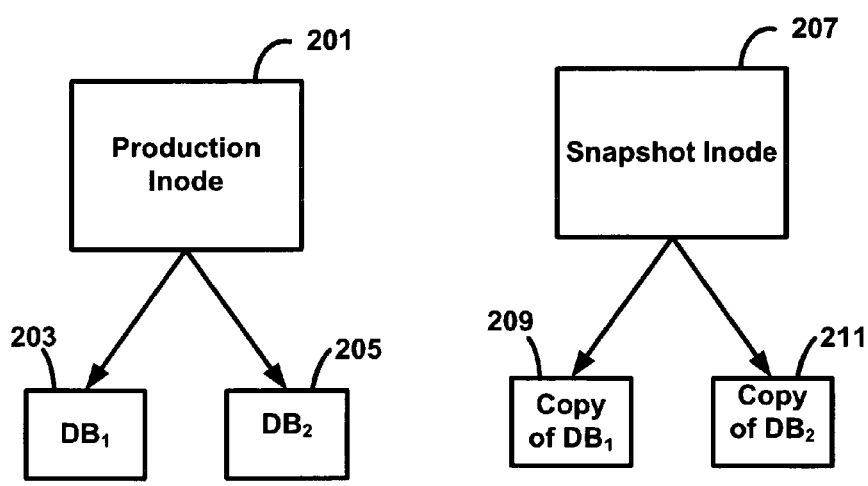
FIG. 2 is a block diagram of a prior art technique for creating a snapshot copy of a file.
Figure 3A:
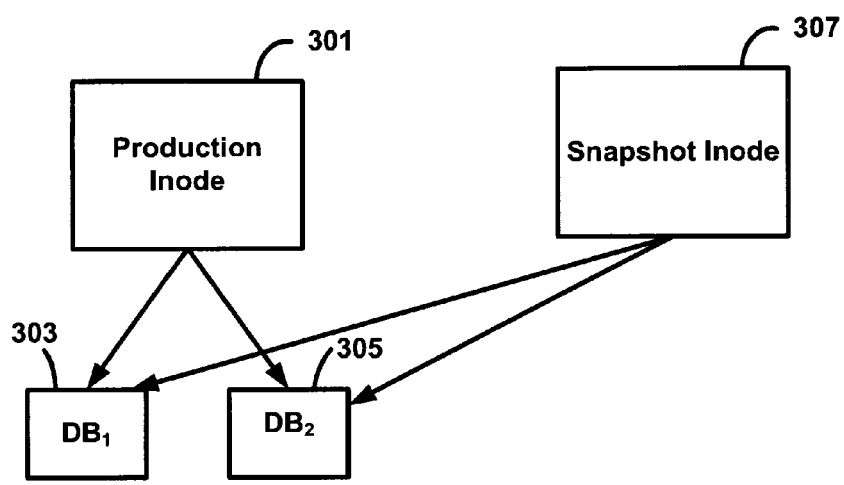
FIGS. 3A and 3B are block diagrams of a prior art copy-on-write technique for creating a snapshot of a file.
Figure 3B:
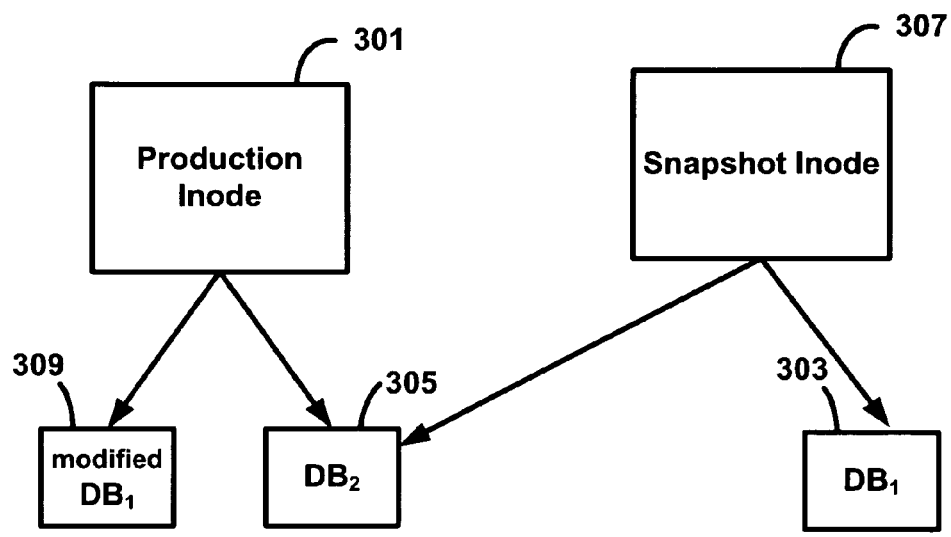
Figure 4:
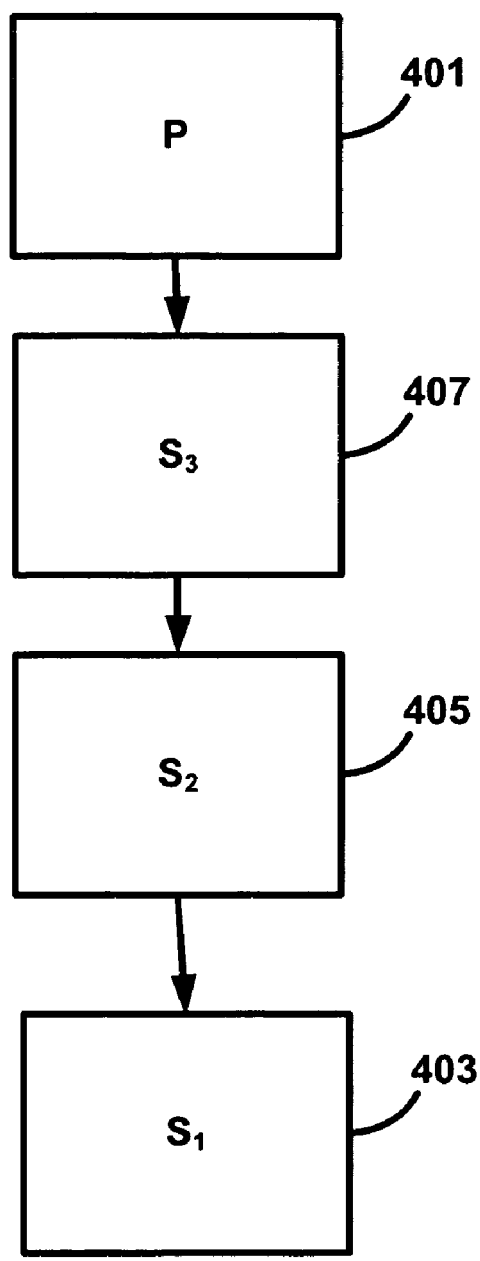
FIG. 4 is a block diagram of a production file having a linear version chain.

Applicants have appreciated that the above-described "ownership" technique for determining whether blocks pointed to by a deleted snapshot or production file works well when the snapshots of a production file are created in a series without any branches, such that a version chain of the production file can be thought of as linear. For example, FIG. 4 shows a production file 401 from which three snapshots were created at different points in time. Each of these snapshots can be considered an earlier version of the production file. Thus, snapshot 403 may be considered the first version of the production file, snapshot 405 may be considered the second version of the production file, and snapshot 407 may be considered the third version of the production file. When the version chain is linear, as shown in FIG. 4, the path via which ownership of blocks is transferred upon deletion of a snapshot is clear. For example, if snapshot 403 is deleted then ownership of any shared blocks owned by snapshot 403 can be passed one level up the version chain to snapshot 405 (i.e., the next most recent snapshot). However, Applicants have appreciated that passing ownership of shared blocks becomes much more complex when the version chain is not linear.

If a branch file is created from a previously-created snapshot of a production file, the version chain is no longer linear.

Figure 5:
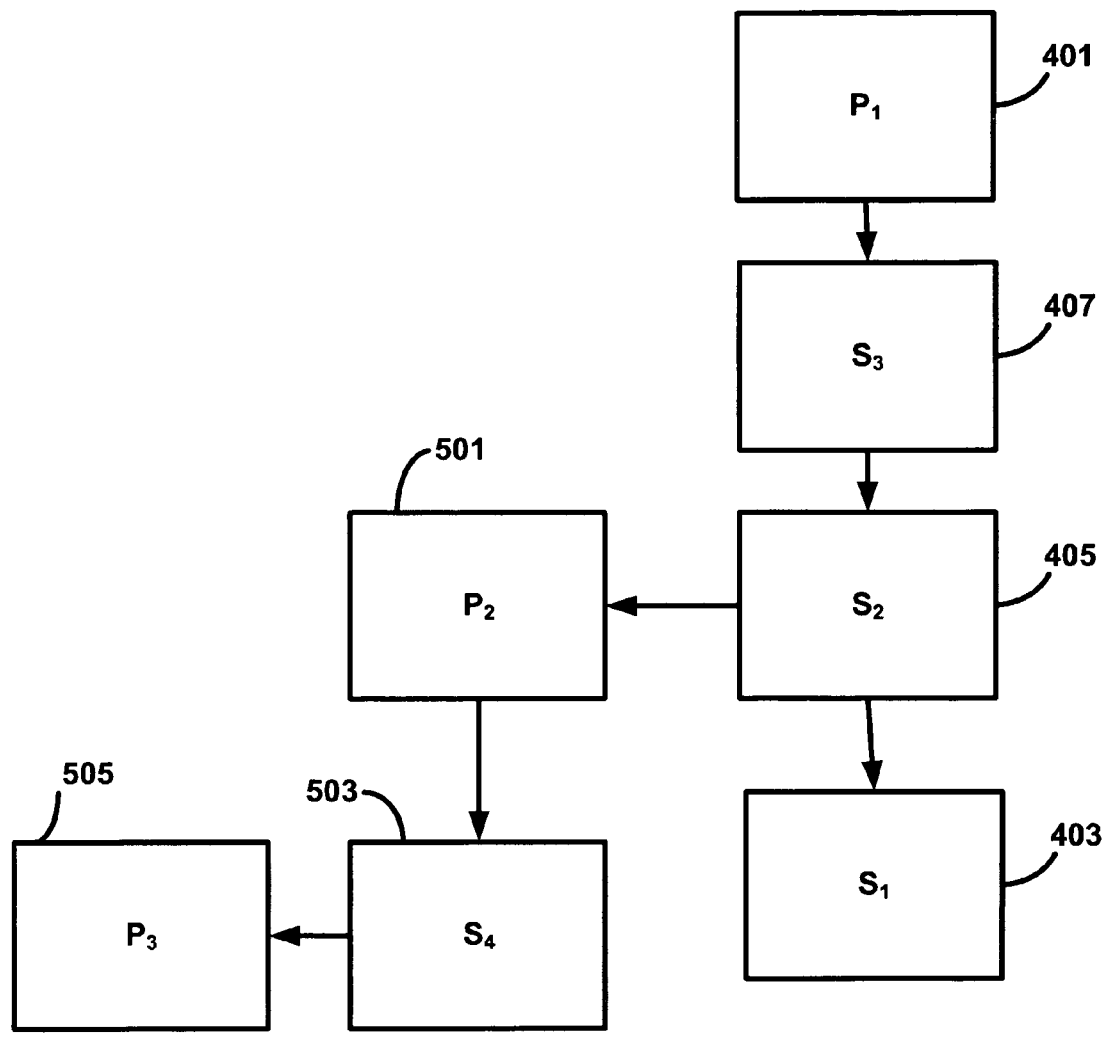
FIG. 5 is a block diagram of a production file having a non-linear version chain.

A branch file is a working copy (i.e., a readable and writable copy of a file) that is created from a previously-created snapshot of the file. For example, as shown in FIG. 5, branch file 501 is created from snapshot 405 of production file 401. If snapshot 405 is deleted before branch file 501, then determining who should own the blocks shared by snapshot 405, snapshot 407 and branch file 501 becomes complex. This problem becomes even more complicated if a snapshot 503 is created from branch file 501 and then a second branch file 505 is created from snapshot 503.

Applicants have appreciated that using reference counts to determine when a block may be freed may be simpler than tracking ownership of blocks, particularly in cases where the version chain of a production file is non-linear. That is, Applicants have appreciated that a reference count may be kept for blocks in the file system. The reference count for a block may be incremented each time a new production file, snapshot, or branch file is created that points to the block, and may be decremented each time a production file, snapshot, or branch file that points to the block is deleted. When the reference count for a block is zero (i.e., it is not pointed to by any production file, snapshots, or branch files), the block is available to be freed. Thus, in some embodiments, reference counts may be used to determine whether a block may be freed.

Using reference counts to determine whether a block may be freed presents challenges. For example, when a new snapshot or branch file is created, the number of files referencing the blocks pointed to by the snapshot or branch file increases. Large files may have millions of blocks. Thus, updating the reference counts of each of these blocks each time a snapshot or branch file is created may take a significant amount of time. Similarly, when a production file, snapshot or branch file is deleted, decrementing the reference count of each block pointed to by the deleted file may require significant processing time. For large files, the amount of time needed to update the reference counts for each block may be significant.

Thus, some embodiments are directed to using reference counts to determine whether a block may be freed, but deferring some or all of the work of updating reference counts when a snapshot or branch file is created until some. Some examples of techniques for accomplishing this are described in greater detail below.

Applicants also have appreciated that reference counts may be used to determine whether blocks pointed to by a snapshot or branch file in a non-linear version chain may be freed upon deletion of the snapshot or branch file. Some examples of techniques for accomplishing this are described in greater detail below.

Applicants also have appreciated that when updating reference counts for the blocks of a file, not all of the reference counts need be updated. Thus, in some embodiments, when updating reference counts for blocks of a file, the reference counts for only a portion of the blocks are updated. Some examples of techniques for accomplishing this are described in greater detail below.

Applicants also have appreciated that reference counts may be used to increase storage capacity even for files that are not related and/or are not in the same version chain. That is, in some embodiments, duplicate blocks in a file system that are part of different files may be identified and one of these duplicate blocks may be freed. Techniques for accomplishing this are described in greater detail below.

As discussed above, some embodiments relate to maintaining a reference count for blocks in a file system, but deferring updating reference counts until some time after the point-in-time copy is created. This may be done in any suitable way, as the invention is not limited in this respect.

In some embodiments, a reference count for each data block and indirect block in a production file is maintained. When the production file is initially created, the reference count for each block (i.e., each data and indirect block) in the file is initialized to one. When a point-in-time copy of this file is created, each block is now referenced by an additional file. However, rather than updating the reference counts for all of these blocks at the time the point-in-time copy is created, updating at least some of the reference counts may be deferred until some later time. In some embodiments, the update of the reference count for a block may deferred until the production file is modified (e.g., by a write to the file).

Figure 6:
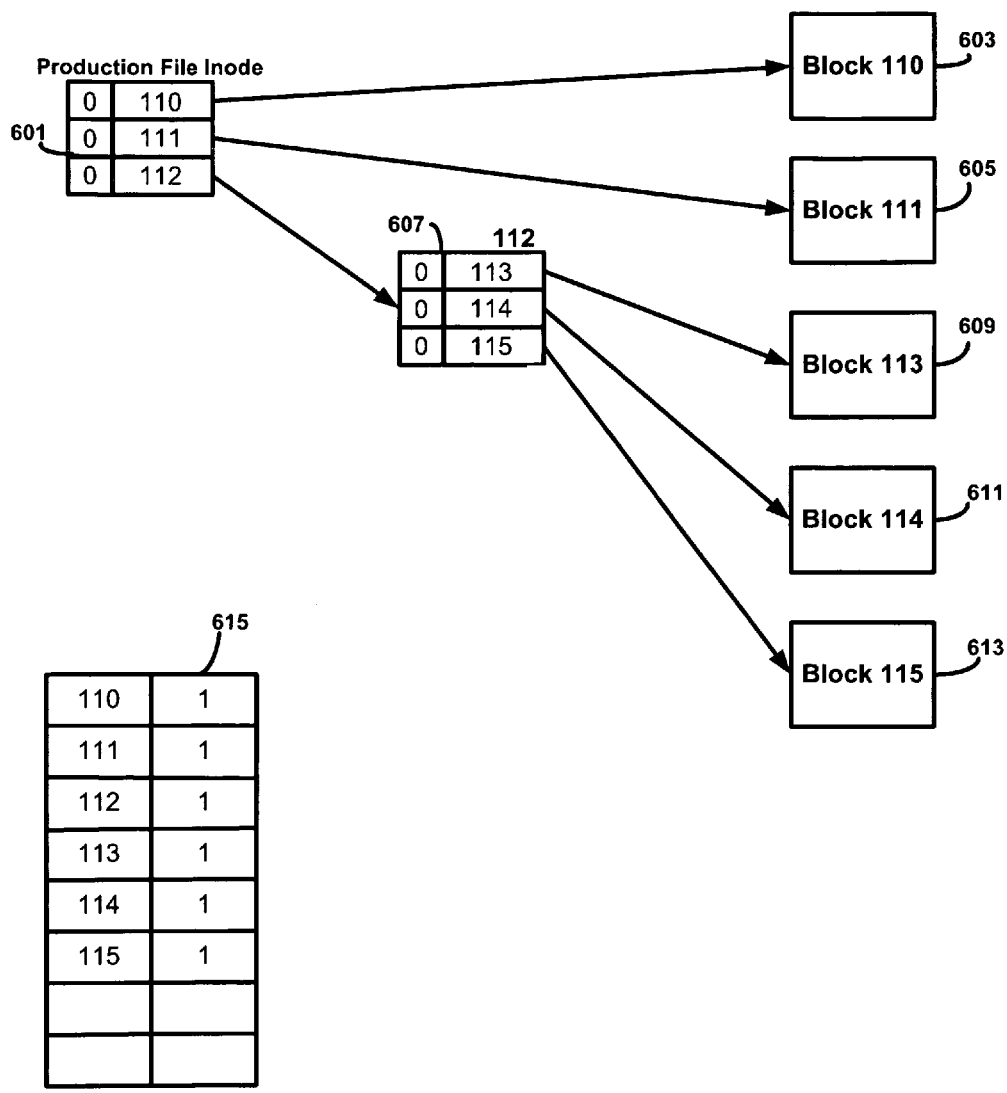
FIG. 6 is a block diagram showing creation of an illustrative production file in accordance with some embodiments.

For example, as shown in FIG. 6, the inode 601 for a production file includes pointers to data blocks 603 and 605 (which are stored at block addresses 110 and 111 respectively) and a pointer to indirect block 607 (which is stored at block address 112). Indirect block 607 includes pointers to data blocks 609, 611, and 613 (stored at block addresses 113, 114, and 115, respectively). Reference count map 615 stores the reference count for each block of the file. Because these blocks are only part of one file, the reference count for each of these blocks is one.

In the simplified example of FIG. 6, indirect block 607 includes pointers to several data blocks. Thus, the production file shown in FIG. 6 only has one level of indirection. However, it should be appreciated that some files may have multiple (e.g., two or more) levels of indirection. In such files, the inode may include pointers to one or more indirect blocks and some or all of these indirect blocks may include pointers to other indirect blocks. If there are more than two levels of indirection, these other indirect blocks may include pointers to additional indirect blocks. In this respect, the chain of pointers can be thought of as forming a hierarchical tree, with the inode at the root of the tree and the data blocks of the file as the leaf nodes. The indirect blocks are intermediate nodes in the tree (in between the root and the leaf nodes), and the tree may have any suitable number of levels of indirect blocks.

As shown in FIG. 6, each pointer in an inode or indirect block includes a bit, referred to herein as a read-only bit. As discussed below in greater detail, this bit is used to indicate that the block that the pointer points to is not writable and to indicate that the reference count for that block is updated. In the example of FIG. 6, the read-only bit is shown as the most significant bit in each pointer. However, the invention is not limited in this respect, as the read-only bit may occupy any suitable position in the pointer. As shown in FIG. 6, each of the read-only bits in inode 601 and indirect block 112 is initialized to zero because of each of the blocks pointed to is writable.

Figure 7:
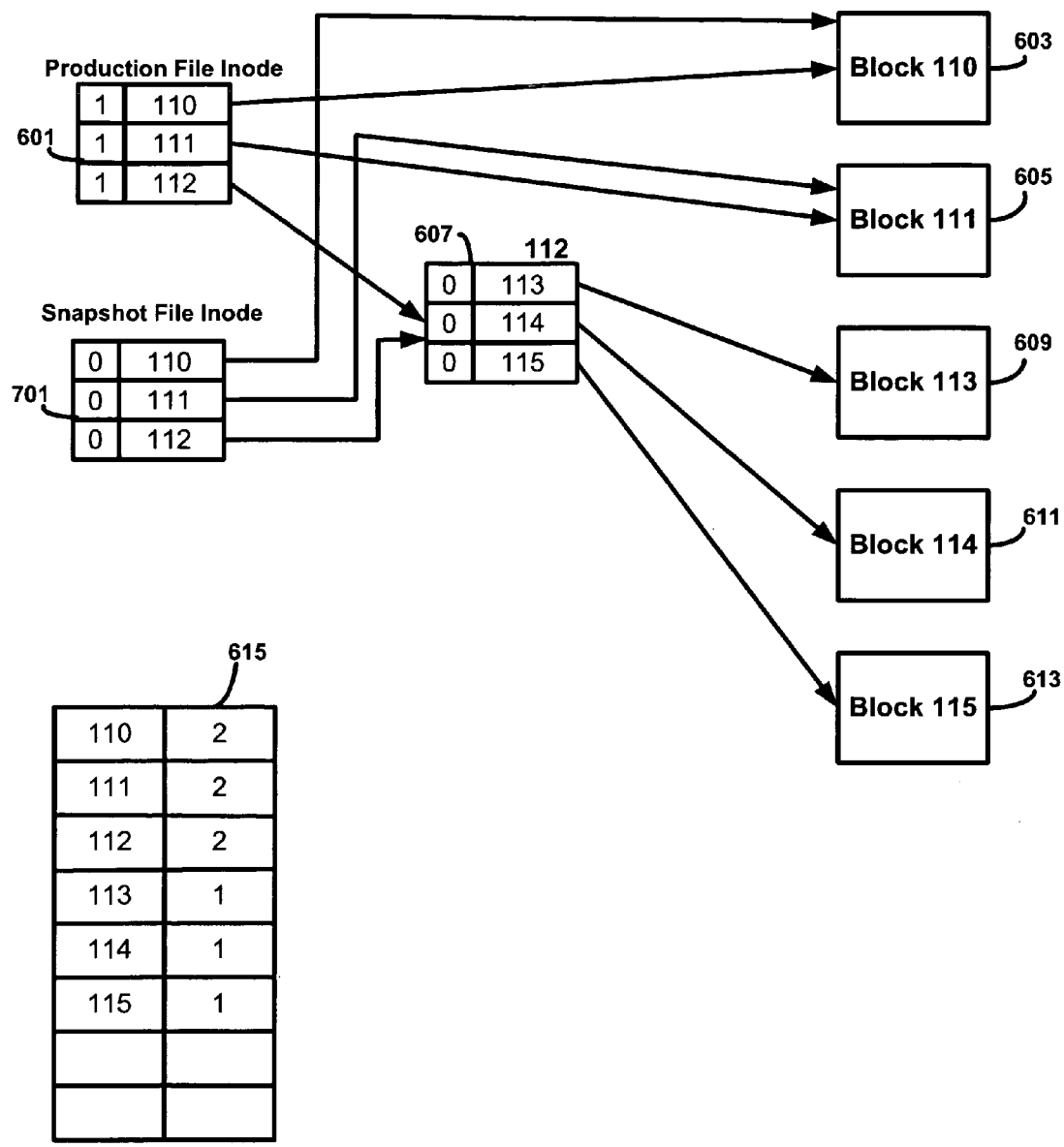
FIG. 7 is a block diagram showing creation of an illustrative snapshot of the production file of FIG. 6, in accordance with some embodiments.

Immediately after a point-in-time copy of a file is created, the point-in-time copy points to the same blocks as the file from which it is created. For example, FIG. 7 shows a snapshot copy of the file shown in FIG. 6. As shown in FIG. 7, when a snapshot copy of the file is created, a new inode 701 is created for the snapshot file. The pointers from production file inode 601 are copied to snapshot inode 701. In addition, the reference counts in reference counter 615 for each block pointed to directly by inode 601 (i.e., blocks 603, 605, and 607) are updated to two. The reference counts for the blocks not directly pointed to by inode 601 (i.e., blocks 609, 611, and 613) are not updated at the time of creation of the snapshot. Rather, the update of these reference counts is deferred until some later time. In addition, as shown in FIG. 7, the read-only bits for each block pointed to production file inode 601 is set to 1 indicating that the reference count for each of these blocks has been updated and each of these blocks is a read-only block because it is pointed to by a read-only copy of the production file. Blocks 609, 611, and 613 may also be treated as read-only blocks even though the read-only bits in the pointers to these blocks in indirect block 607 are not set to one. That is, because indirect block 607 is a read-only block, all the blocks that it points to are considered read-only blocks.

Figure 8:
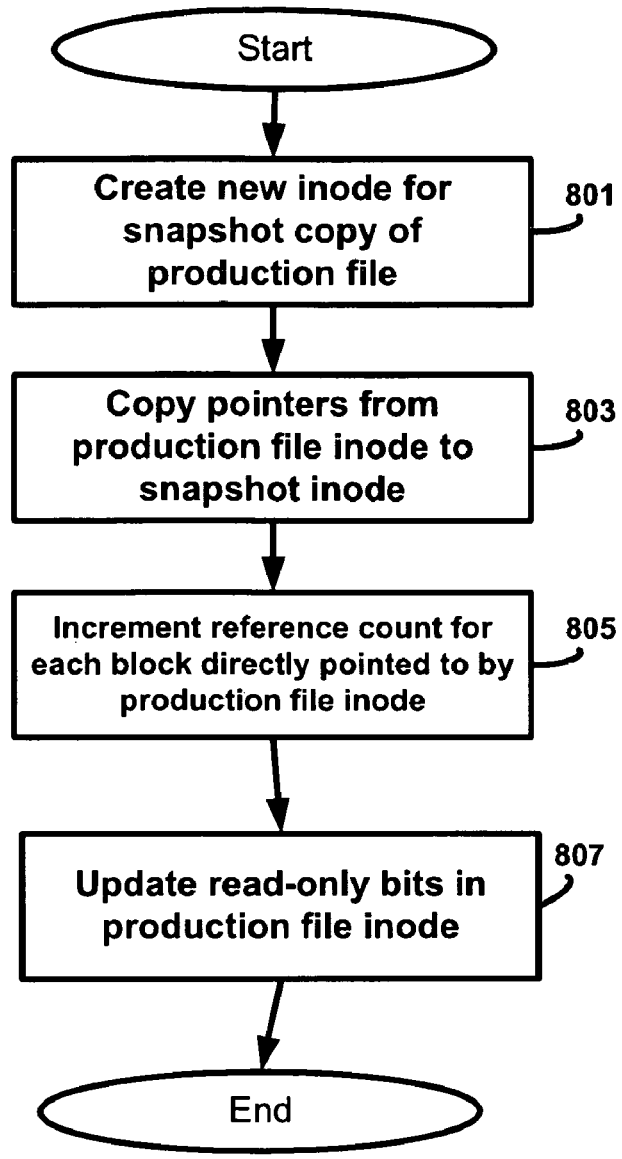
FIG. 8 is a flow chart showing an illustrative process for creating a snapshot copy of a production file, in accordance with some embodiments.

FIG. 8 shows a flow chart of an illustrative process for creating a snapshot copy of a production file. The process begins at act 801 where an new inode is created for the snapshot copy of the production file. The process continues to act 803 where the pointers from the production file inode are copied to the newly created snapshot inode. The process next continues to act 805, where the reference count for each block directly pointed to by the production file inode is incremented by one, to reflect the fact that the snapshot copy of the file also points to these blocks. The reference counts for any blocks (including indirect blocks) that are not directly pointed to by the production file inode are not updated, as the update of these reference counts is deferred until a later time. The process next continues to act 807, where the read-only bit for each pointer in the production file inode is set to reflect that the blocks pointed to by these pointers are not writable and that the reference counts for these blocks are updated.

As discussed above, in some embodiments, updating some of reference counts that are not updated when a snapshot copy of a production file is created may be deferred until the production file is modified. This reduces the processing time used in creating a snapshot copy of the production file. Moreover, if the snapshot copy of the production file is deleted prior to modification of the production file, these reference counts need not be updated at all.

Figure 9:
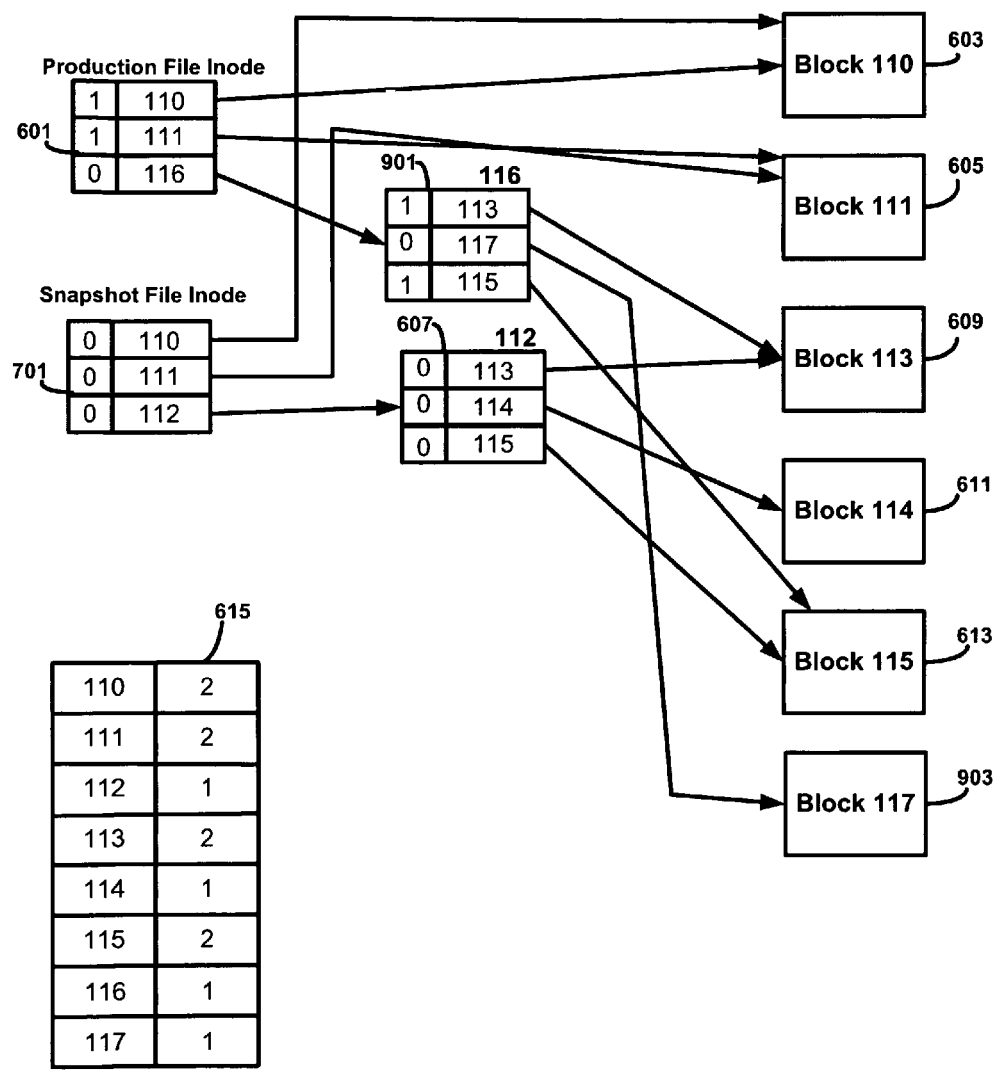
FIG. 9 is a block diagram of the production file and snapshot copy of FIG. 7 after modification of a block of the production file, in accordance with some embodiments.

FIG. 9 shows an example of updating the reference counts for blocks not directly pointed to by the production file shown in FIG. 7 after a block of the production file has been modified. In this example, the fourth block (i.e., block 611) of the production file is modified. Because block 611 is used by the snapshot copy of the inode and is therefore read-only, a new data block 903 (stored at block address 117) is allocated to store the modified data and the reference count for this new data block is set to one in reference counter 615. In addition, indirect block 607 is updated to point to new data block 903, and the read only bit in this pointer is initialized to zero. Because indirect block 607 is read-only, a new indirect block 901 is created, the reference count for this new indirect block is set to one, and the pointers from indirect block 607 are copied to indirect block 901, but the pointer that points to the data block that was modified is updated to point to the modified data block 903. In addition, production file inode 601 is updated to point to new indirect block 901 instead of the older version of the indirect block, and the read-only bit of this pointer is set to zero.

As shown in reference counter 615, the reference count for indirect block 607 is decremented to one because it is pointed to only by snapshot inode 701, and not production file inode 601. In addition, the deferred update of the reference counts for blocks 609, 611, and 613 is performed. Because blocks 609 and 613 are pointed to by the production file and the snapshot copy, the reference counts of these files are updated to two. Block 611 is only pointed to by the snapshot copy, so the reference count for this block remains one. The read-only bits in the pointers to data blocks 609 and 613 in indirect block 901 are set to one to indicate that these blocks are not writable and that their reference counts have been updated.

As can be appreciated from the discussion above, the use of the read-only bit in the examples above allows reference count updates to be deferred because it facilitates a determination that when a request to modify a shared block occurs, the block cannot be overwritten, even if the reference count for that block suggests that the file being modified is the only file using that block.

Figure 10:
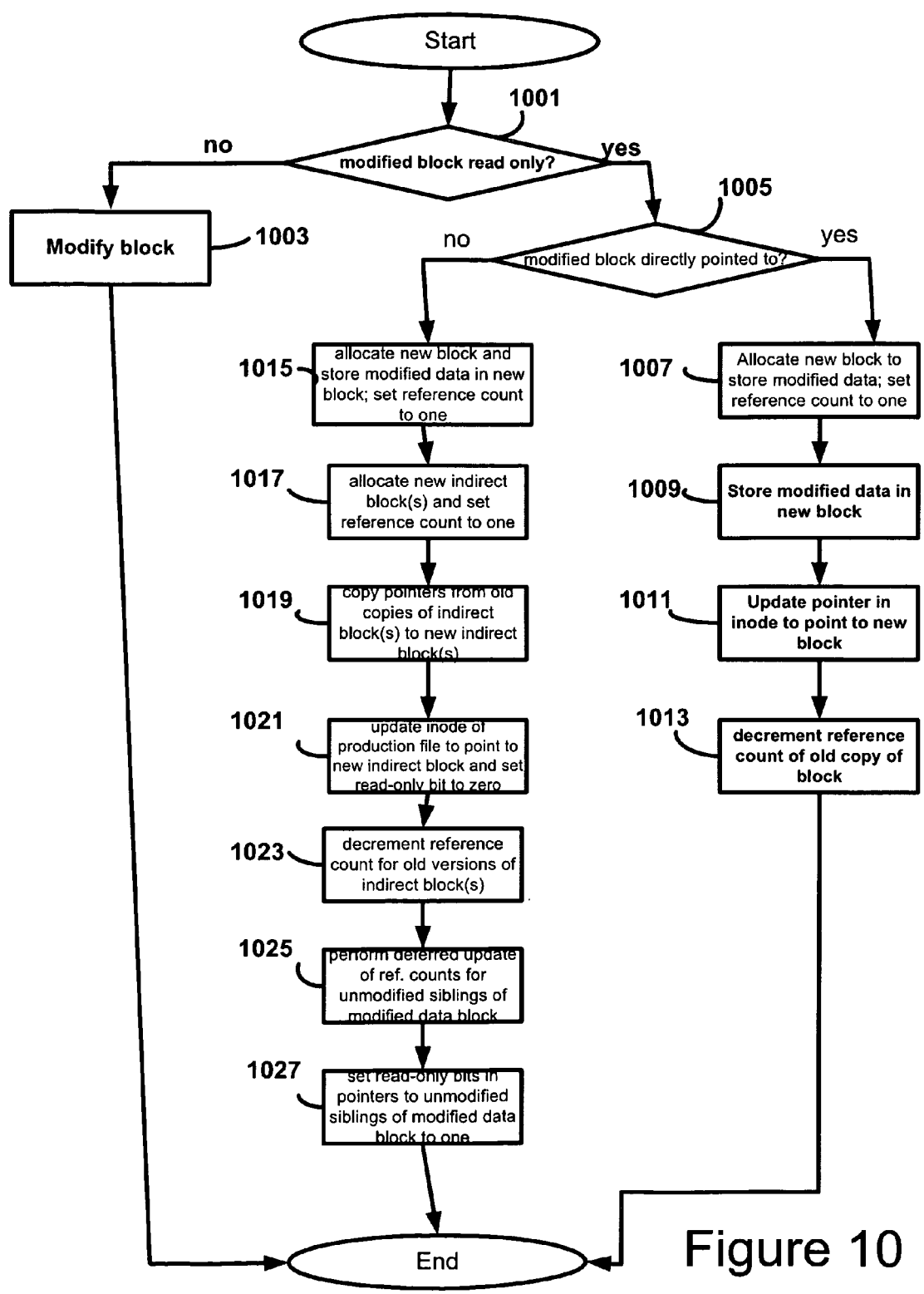
FIG. 10 is a flow chart showing an illustrative process for modifying a block of a production file, in accordance with some embodiments.

FIG. 10 shows an illustrative process for modifying a block of a writable file (e.g., a production file or branch file). The process begins at act 1001 where it is determined if the block being modified is a read-only block. If not, the process continues to act 1003, where the block is modified and the process ends. If the block is read-only, the process continues to act 1003, where it is determined if the production file inode points to directly to the block being modified. If the block being modified is directly pointed to, the process continues to act 1007, where a new block is allocated to store the modified data and the reference count of the new block is set to one. The process next continues to act 1009, where the modified data is stored in the newly allocated block. The process then continues to act 1011, where the production file inode is updated to point to the modified block and the read-only bit in this pointer is set to zero. The process next continues to act 1013, where the reference count of the previous version of the block is decremented to reflect that the production inode no longer points to it and the process ends.

If, at act 1005, the block being modified is not directly pointed to by the production file inode, the process continues to act 1015, where a new data block is allocated to store the modified data block, the modified data is stored in the new data block, and the reference count for the new data block is set to one. The process then continues to act 1017, where one or more new indirect blocks are allocated and the reference counts for these indirect blocks are set to one. In the example of FIG. 9, the data block being modified is pointed to by an indirect block that is directly pointed to by the production file inode. However, in some situations, the indirect block that points to the block being modified may not be directly pointed to by the production file inode but rather may be directly pointed to by another indirect block. That is, there may be two or more indirect blocks in a chain from the production file inode to the data block being modified. Because each indirect block in this chain is updated to point to either a new indirect block or a new data block, a new indirect block is allocated for each older version of the indirect block in the chain.

The process then continues to act 1019, where the pointers from the previous versions of the indirect blocks in the chain that are not being updated are copied to the new versions of the indirect blocks. The process then continues to act 1021, where the production file inode is updated to point the new indirect block at the top of the chain and the read-only bit in this pointer is set to zero. The process then continues to act 1023, where the reference counts for the old versions of the indirect blocks in the chain are decremented by one. The process next continues to act 1025 where the deferred update of the reference counts for the unmodified sibling data blocks of the modified data block is performed. The sibling data blocks of a data block are the blocks that are pointed to by the same indirect block as the data block. Because the chain of indirect blocks that point to these sibling data blocks are, upon modification of the data block, are, at least initially, only used by the production file, it may not be possible to infer, using the reference count of the indirect blocks, that the update of the reference counts for these data blocks has been deferred. Thus, at act 1025, the reference counts of these sibling blocks may be incremented to reflect the number of files that are currently using them. The process next continues to act 1027, where the read-only bits in the pointers to the unmodified siblings of the modified data block are set to one to reflect that these blocks are not writable and that their reference counts are updated.

As discussed above, in some embodiments, when a shared block of a production file is requested to be modified, a deferred update of the reference count for the blocks of the production file may be performed. As should be appreciated from the illustrative process described above in connection with FIG. 10, in some embodiments, only some of the reference counts for the blocks of the production file need be updated when a data block of the production file is modified. For example, as discussed above, in some embodiments, only the reference counts for the indirect blocks in the chain from the production inode to the modified data block and the reference counts for the sibling data blocks of the modified data block may be updated. Because, as discussed above, large files may have millions of blocks, it may be advantageous to update the reference counts for only a portion of these blocks upon modification of any given block to reduce the amount of time needed to process the request to modify the production file.

In the example of FIG. 10, it is assumed that if a data block is read-only, the indirect blocks that point to it are also read-only. However, in some situations a data block that is read-only may be pointed to by an indirect block that is writable. Such a situation may occur if a new indirect block has been allocated for a file (i.e., after creation of a snapshot of a file) in response to a previous request to modify a different data block of the file. In such situations, when a request to modify the data block is received, new indirect blocks need not be allocated. Rather, the a new data block may be allocated and the pointer in the indirect block may be updated to point to the newly allocated data block.

It should be appreciated that the illustrative process shown in FIG. 10 is only one example of a process for performing a deferred update of reference counts and the invention is not limited to this particular process, as any suitable process may be used. Moreover, the process depicted in FIG. 10 is a process for modifying a single block of a writable file. However, in many situations, a write request to a file results in modification of multiple different blocks. When modifying multiple different blocks of a production file, the process of FIG. 10 need not be repeated serially for each block being modified, as many of the acts in FIG. 10 may be performed in parallel for different blocks. Moreover, the order of the acts depicted in FIG. 10 is only illustrative, and the invention is not limited to performing the acts in the depicted order, as these acts may be performed in any suitable order.

As discussed above, reference counts may be used to determine when a block is available to be freed upon deletion of a point-in-time copy of a file. This may be done in any suitable way, as the invention is not limited in this respect.

For example, in some embodiments, to determine whether a block in a file to be deleted may be freed, it may first be determined whether the reference count for the block is updated. This may be done in any suitable way, as the invention is not limited in this respect. For example, if the point-in-time copy has a direct pointer to the block, the reference count for the block may be considered to be updated, because as discussed above, these reference counts are updated upon creation of the point-in-time copy. If the point-in-time copy does not have a direct pointer to the block, but the top level indirect block, to which the point-in-time copy does have a direct pointer (and that points either directly or indirectly to the block) has a reference count greater than the reference count of the block, then the reference count for the block is not updated.

If it is determined that the reference count for the block has been updated and it is greater than one, then the block cannot be freed because it is still being used by another file. If the reference count for the block has been updated but is equal to one, then the block can be freed because the point-in-time copy being deleted is the only one using the block. Finally, if the reference count for a block has not been updated, the reference count may be updated (i.e., to reflect the reference count of the indirect block pointed to by the top-level pointer) and, if the updated reference count is not greater than one, the block may be freed.

Figure 11:
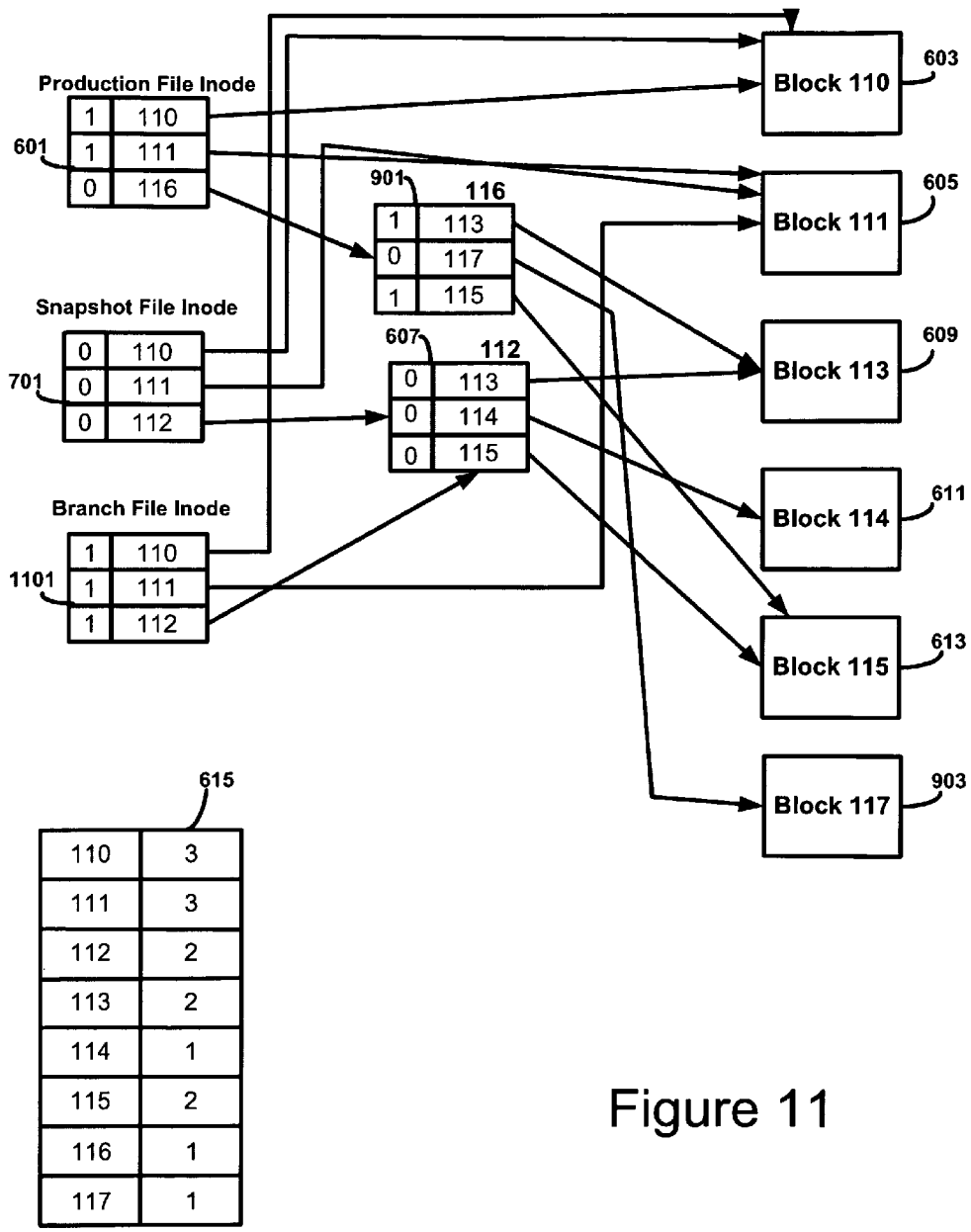
FIG. 11 is a block diagram showing creation of an illustrative branch file from the previously-created snapshot copy of a production file shown in FIG. 9, in accordance with some embodiments.

As discussed above, in some embodiments, a branch file that is writable may be created from a previously created snapshot copy of a production file. For example, FIG. 11 shows creation of a branch file from the previously-created snapshot file shown in FIG. 9. In FIG. 11, branch file inode 1101 is created and the pointers from the snapshot inode 701 (the inode for the snapshot from which the branch file is created) are copied to branch file inode 1101. The reference count in reference counter 615 for each block directly pointed to in branch file inode 1101 (i.e., blocks 603, 605, and 607) is updated to reflect that these blocks are now being used by an additional file, but the reference count updates for the blocks indirectly pointed to by branch file inode 1101 are deferred until modification of the branch file (e.g., in the manner discussed above in connection with FIG. 10). The read-only bits of each of the pointers in branch file inode 1101 is set to one to indicate that the blocks pointed to by these pointers are not writable and that the reference counts for these blocks are updated.

Figure 12:
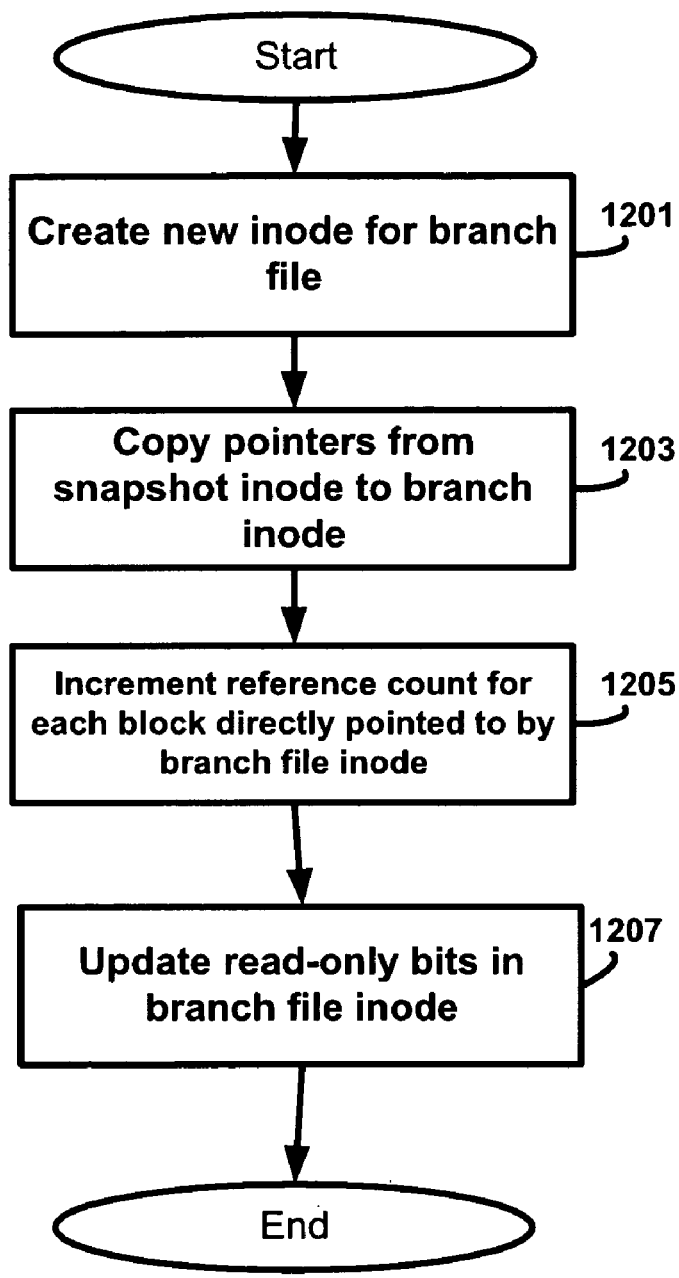
FIG. 12 is a flow chart of an illustrative process for creating a branch file from a previously-created snapshot copy of a production file, in accordance with some embodiments.

FIG. 12 shows an illustrative process for creating a branch file from a previously created snapshot of a production file. The process begins at act 1201 where a new inode is created for the branch file. The process next continues to act 1203, where the pointers from the snapshot inode from which the branch file is created are copied to the new branch file inode. The process next continues to act 1205, where the reference count for each block directly pointed to by the branch file inode is updated to reflect that these blocks are now being used by an additional file. The reference counts for the blocks of the branch file not directly pointed to by the branch file inode are not updated, as the update of these reference counts may be deferred until, for example, one or more blocks of the branch file are modified. The process then continues to act 1207, where the read-only bit for each pointer in the branch file inode is set to one to indicate that the blocks pointed to by these pointers are not writable and that the reference counts for these blocks are updated.

As discussed above, in some embodiments, reference counts may be used to aid in de-duplication of file system blocks. That is, Applicants have appreciated that two or more files in a file system may have blocks that are identical to each other, and that storage capacity may be increased by deleting (i.e., freeing) some of these blocks (e.g., leaving only one) and modifying each file to point to the block(s) that remains. This may be done in any suitable way, as the invention is not limited in this respect.

For example, when the blocks that are identical to a particular block are freed, the pointers for the files that previously pointed to the freed block may be updated to point to the remaining copy of the block. A reference count may be kept for the remaining block that indicates the number of files that are using the block. When one of these files is deleted, the reference count may be decremented. When the reference count reaches zero, the block may be freed.

The above-described techniques may be implemented in any suitable file system and on any computer suitable system, as the invention is not limited in this respect. One example of a computer system in which some embodiments may be implemented is a network file server. An example of such a file server in a computer network is shown in FIG. 13.

Figure 13:
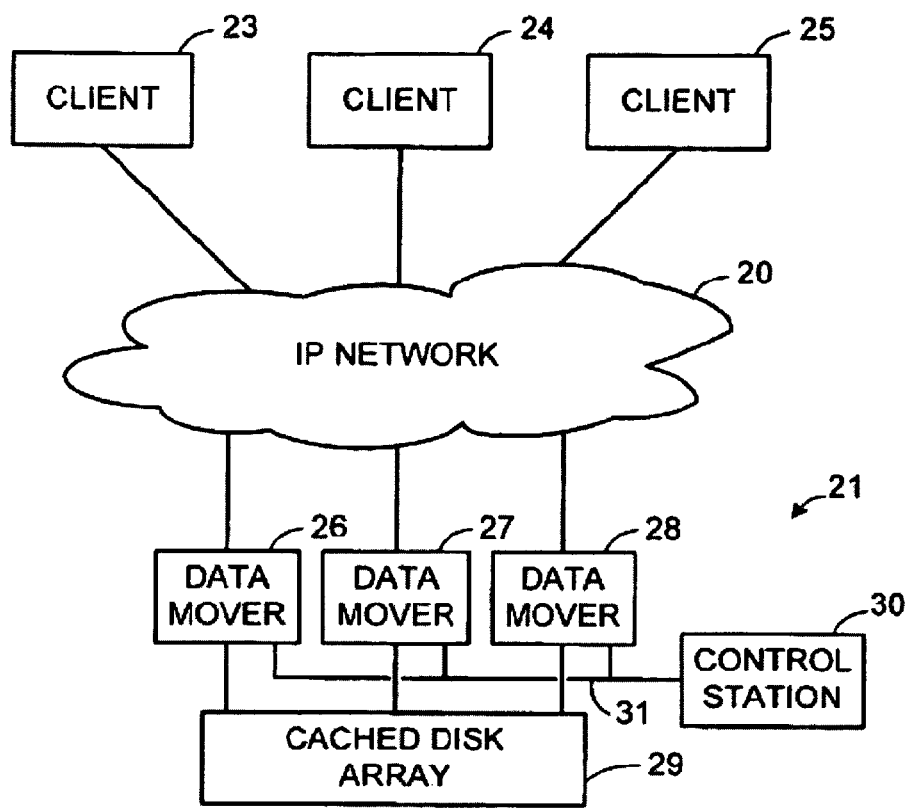
FIG. 13 is a block diagram of a computer network including a network file server upon which some embodiments may be implemented.

FIG. 13 shows an Internet Protocol (IP) network 20 including a network file server 21 and multiple clients 23, 24, 25. The network file server 21 may have, for example, multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29. The clustering of the data movers 26, 27, 28 as a front end to the cached disk array 29 provides parallelism and scalability.

The data movers may be implemented in any suitable way, as the invention is not limited in this respect. For example, each of the data movers 26, 27, and 28 may be a commodity computer, that includes at least one memory for storing executable code to perform the techniques described above and at least one processor to execute this code.

The data mover computers 26, 27, and 28 may communicate with the other network devices in any suitable way, as the invention is not limited in this respect. For example, the data movers may communicate using standard file access protocols such as the Network File System (NFS) or the Common Internet File System (CIFS) protocols, but the data mover computers need not necessarily employ standard operating systems. For example, in some embodiments, the network file server 21 may be programmed with a Unix-based file system that has been adapted for rapid file access and streaming of data between the cached disk array 29 and the data network 20 by any one of the data mover computers 26, 27, 28.

Figure 14:
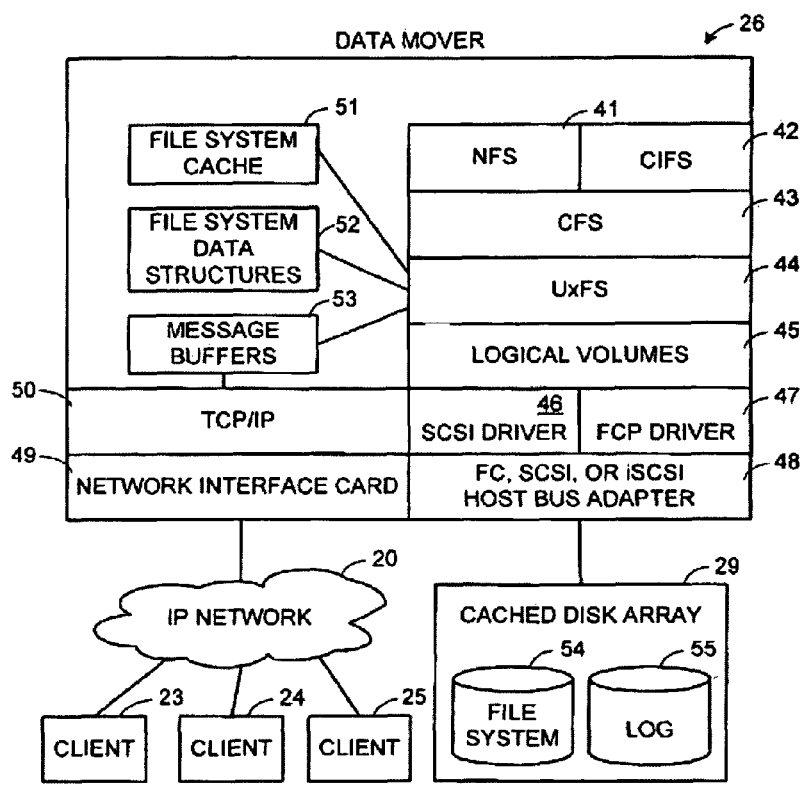
FIG. 14 is a block diagram of an illustrative data mover of the network file server of FIG. 13.

FIG. 14 is a block diagram of an example of a data mover. As shown in FIG. 14, data mover 26 has a Network File System (NFS) module 41 for supporting communication among the clients and other data movers over the IP network 20 using the NFS file access protocol, and a Common Internet File System (CIFS) module 42 for supporting communication over the IP network using the CIFS file access protocol. The NFS module 41 and the CIFS module 42 are layered over a Common File System (CFS) module 43, and the CFS module is layered over a Universal File System (UxFS) module 44. The UxFS module supports a UNIX-based file system, and the CFS module 43 provides higher-level functions common to NFS and CIFS.

The UxFS module accesses data organized into logical volumes defined by a module 45. Each logical volume maps to contiguous logical storage addresses in the cached disk array 29. The module 45 is layered over a SCSI driver 46 and a Fibre-channel protocol (FCP) driver 47. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24,25.

To maintain the file system 54 in a consistent state during concurrent writes to a file, the UxFS layer maintains file system data structures 52 in random access memory of the data mover 26. To enable recovery of the file system 54 to a consistent state after a system crash, the UxFS layer writes file metadata to a log 55 in the cached disk array during the commit of certain write operations to the file system 54.

Aspects of the invention, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in a computer system having a file system that stores a plurality of files in a plurality of data blocks allocated to the file system, each of the plurality of files including at least one of the plurality of data blocks allocated to the file system, the computer system maintaining a reference count for at least some of the data blocks, each reference count for a corresponding data block providing an indication of a number of files that share the corresponding data block, the method comprising:

(A) in response to a request to create a point in time copy of at least one existing file in the file system, the at least one existing file including an indirect association with at least one data block, the computer system:

(A1) creating at least one new file that is a point in time copy of the at least one existing file, wherein the at least one new file and the at least one existing file share the at least one data block using the indirect association; and (A2) deferring updating the reference count for the at least one data block to reflect that the at least one data block is shared by the at least one new file and the at least one existing file via the indirect association; and (B) after deferring the updating of the reference count, the computer system updating the reference count for the at least one data block following an event that affects at least one direct association with the at least one data block, wherein the file system includes a first file system, wherein the at least one existing file includes the plurality of files in the first file system so that the act (A) is performed in response to a request to create a point in time copy of the first file system, and wherein (A1) includes creating a new file system that is a point in time copy of the first file system and (A2) includes deferring updating the reference count for the plurality of data blocks allocated to the first file system to reflect that the plurality of data blocks allocated to the first file system are shared by the at least one new file system, and wherein the plurality of files in the first file system includes a first file comprising a plurality of data blocks, and wherein the act (B) further includes updating the reference count for at least some of the plurality of data blocks in the first file to reflect that the at least some of the plurality of data blocks in the first file are shared by a second file in the new file system in response to a write occurring to the first file after the creation of the new file system and wherein the plurality of data blocks in the first file comprises at least first and second data blocks, and wherein the act (B) further comprises an act of:

updating the reference count for the first data block to reflect that the first data block is shared by the second file in response to a write occurring to the first file that results in overwriting the second data block but does not result in overwriting the first data block.

2. A method for use in a computer system having a file system that stores a plurality of files in a plurality of data blocks allocated to the file system, each of the plurality of files including at least one of the plurality of data blocks allocated to the file system, the computer system maintaining a reference count for at least some of the data blocks, each reference count for a corresponding data block providing an indication of a number of files that share the corresponding data block, the method comprising:

(A) in response to a request to create a point in time copy of at least one existing file in the file system, the at least one existing file including an indirect association with at least one data block, the computer system:

(A1) creating at least one new file that is a point in time copy of the at least one existing file, wherein the at least one new file and the at least one existing file share the at least one data block using the indirect association; and (A2) deferring updating the reference count for the at least one data block to reflect that the at least one data block is shared by the at least one new file and the at least one existing file via the indirect association; and (B) after deferring the updating of the reference count, the computer system updating the reference count for the at least one data block following an event that affects at least one direct association with the at least one data block, wherein the at least one existing file comprises a first file comprising a plurality of data blocks, and wherein the act (B) further includes updating the reference count for at least some of the plurality of data blocks in the first file to reflect that the at least some of the data blocks are shared by the at least one new file in response to a write occurring to the first file after the creation of the at least one new file, wherein the plurality of data blocks in the first file comprises at least first and second data blocks, and wherein the act (B) further comprises an act of:

updating the reference count for the first data block to reflect that the first data block is shared by the at least one new file in response to a write occurring to the first file that results in overwriting the second data block but does not result in overwriting the first data block.

3. At least one computer readable medium encoded with instructions that, when executed, perform a method for use in a computer system comprising a file system that stores a plurality of files in a plurality of data blocks allocated to the file system, each of the plurality of files comprising at least one of the plurality of data blocks allocated to the file system, the computer system maintaining a reference count for at least some of the data blocks, each reference count for a corresponding data block providing an indication of a number of files that share the corresponding data block, the method comprising:

(A) in response to a request to create a point in time copy of at least one existing file in the file system, the at least one existing file including an indirect association with at least one data block, the computer system:

(A1) creating at least one new file that is a point in time copy of the at least one existing file, wherein the at least one new file and the at least one existing file share the at least one data block using the indirect association; and (A2) deferring updating the reference count for the at least one data block to reflect that the at least one data block is shared by the at least one new file and the at least one existing file via the indirect association; and (B) after deferring the updating of the reference count, the computer system updating the reference count for the at least one data block following an event that affects at least one direct association with the at least one data block, wherein the file system includes a first file system, wherein the at least one existing file includes the plurality of files in the first file system so that the act (A) is performed in response to a request to create a point in time copy of the first file system, and wherein (A1) includes creating a new file system that is a point in time copy of the first file system and (A2) includes deferring updating the reference count for the plurality of data blocks allocated to the first file system to reflect that the plurality of data blocks allocated to the first file system are shared by the at least one new file system, and wherein the plurality of files in the first file system includes a first file comprising a plurality of data blocks, and wherein the act (B) further includes updating the reference count for at least some of the plurality of data blocks in the first file to reflect that the at least some of the plurality of data blocks in the first file are shared by a second file in the new file system in response to a write occurring to the first file after the creation of the new file system and wherein the plurality of data blocks in the first file comprises at least first and second data blocks, and wherein the act (B) further comprises an act of:

updating the reference count for the first data block to reflect that the first data block is shared by the second file in response to a write occurring to the first file that results in overwriting the second data block but does not result in overwriting the first data block.

4. At least one computer readable medium encoded with instructions that, when executed, perform a method for use in a computer system comprising a file system that stores a plurality of files in a plurality of data blocks allocated to the file system, each of the plurality of files comprising at least one of the plurality of data blocks allocated to the file system, the computer system maintaining a reference count for at least some of the data blocks, each reference count for a corresponding data block providing an indication of a number of files that share the corresponding data block, the method comprising:

(A) in response to a request to create a point in time copy of at least one existing file in the file system, the at least one existing file including an indirect association with at least one data block, the computer system:
  (A1) creating at least one new file that is a point in time copy of the at least one existing file, wherein the at least one new file and the at least one existing file share the at least one data block using the indirect association; and
  (A2) deferring updating the reference count for the at least one data block to reflect that the at least one data block is shared by the at least one new file and the at least one existing file via the indirect association; and
(B) after deferring the updating of the reference count, the computer system updating the reference count for the at least one data block following an event that affects at least one direct association with the at least one data block, wherein the at least one existing file comprises a first file comprising a plurality of data blocks, and wherein the act (B) further includes updating the reference count for at least some of the plurality of data blocks in the first file to reflect that the at least some of the data blocks are shared by the at least one new file in response to a write occurring to the first file after the creation of the at least one new file, wherein the plurality of data blocks in the first file comprises at least first and second data blocks, and wherein the act (B) further comprises an act of:
updating the reference count for the first data block to reflect that the first data block is shared by the at least one new file in response to a write occurring to the first file that results in overwriting the second data block but does not result in overwriting the first data block.

5. A computer system, comprising:
a file system that stores a plurality of files in a plurality of data blocks allocated to the file system, each of the plurality of files including at least one of the plurality of data blocks allocated to the file system;
a memory that stores a reference count for at least some of the data blocks, each reference count for a corresponding data block providing an indication of a number of files that share the corresponding data block; and
at least one controller that, in response to a request to create a point in time copy of at least one existing file in the file system, the at least one existing file including an indirect association with at least one data block, performs the following acts:
  creates at least one new file that is a point in time copy of the at least existing file;
  defers updating the reference count for the at least one data block to reflect that the at least one data block is shared by the at least one new file and the at least one existing file via the indirect association; and
  after deferring the updating of the reference count, updates the reference count for the at least one data block following an event that affects at least one direct association with the at least one data block,
wherein the file system includes a first file system, the at least one existing file includes the plurality of files in the first file system, and the at least controller, in response to a request to create a point in time copy of the first file system, creates a new file system that is a point in time copy of the first file system and defers updating the reference count for the plurality of data blocks allocated to the first file system to reflect that the plurality of data blocks allocated to the first file system are shared by the at least one new file system and wherein the plurality of files in the first file system include a first file comprising a plurality of data blocks, and wherein the at least one controller updates the reference count for at least some of the plurality of data blocks in the first file to reflect that the at least some of the plurality of data blocks in the first file are shared by a second file in the new file system in response to a write occurring to the first file after the creation of the new file system, wherein the plurality of data blocks in the first file includes at least first and second data blocks, and wherein the at least one controller updates the reference count for the first data block to reflect that the first data block is shared by the second file in response to a write occurring to the first file that results in overwriting the second data block but does not result in overwriting the first data block.

6. A computer system, comprising:
a file system that stores a plurality of files in a plurality of data blocks allocated to the file system, each of the plurality of files including at least one of the plurality of data blocks allocated to the file system;
a memory that stores a reference count for at least some of the data blocks, each reference count for a corresponding data block providing an indication of a number of files that share the corresponding data block; and
at least one controller that, in response to a request to create a point in time copy of at least one existing file in the file system, the at least one existing file including an indirect association with at least one data block, performs the following acts:
  creates at least one new file that is a point in time copy of the at least existing file;
  defers updating the reference count for the at least one data block to reflect that the at least one data block is shared by the at least one new file and the at least one existing file via the indirect association; and
  after deferring the updating of the reference count, updates the reference count for the at least one data block following an event that affects at least one direct association with the at least one data block,
wherein the at least one existing file includes a first file having a plurality of data blocks, and wherein the at least one controller updates the reference count for at least some of the plurality of data blocks in the first file to reflect that the at least some of the data blocks are shared by the at least one new file in response to a write occurring to the first file after the creation of the at least one new file, and wherein the plurality of data blocks in the first file includes at least first and second data blocks, and wherein the at least one controller updates the reference count for the first data block to reflect that the first data block is shared by the at least one new file in response to a write occurring to the first file that results in overwriting the second data block but does not result in overwriting the first data block.

* * * * *